(12) United States Patent
Schneider et al.

(10) Patent No.: US 7,570,361 B2
(45) Date of Patent: Aug. 4, 2009

(54) TEST METHOD FOR THE TESTING OF THE FUNCTIONAL CAPABILITY OF A MONITORING SENSOR, MONITORING METHOD AND MONITORING SENSOR

(75) Inventors: Walter Schneider, Emmendingen (DE); Otto Görnemann, Kaarst (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 12/099,328

(22) Filed: Apr. 8, 2008

(65) Prior Publication Data

US 2008/0252895 A1 Oct. 16, 2008

(30) Foreign Application Priority Data

Apr. 13, 2007 (DE) .................. 10 2007 017 522

(51) Int. Cl.
*G01N 21/55* (2006.01)
*G01B 11/02* (2006.01)

(52) U.S. Cl. .................. 356/445; 356/607; 356/608; 356/640

(58) Field of Classification Search ........... 356/601, 356/607–608, 614, 622, 629, 639–640, 445; 219/121.73, 121.8, 121.68, 121.7, 121.85; 235/467, 472; 250/559.23

See application file for complete search history.

(56) References Cited

U.S. PATENT DOCUMENTS 4,355,904 A * 10/1982 Balasubramanian ........ 356/608

(Continued)

FOREIGN PATENT DOCUMENTS

DE 3700009 A1 7/1988

(Continued)

OTHER PUBLICATIONS

German Search Report dated Nov. 26, 2007, relating to German Patent Application No. DE102007017522.3, English Translation and German copy enclosed, 9 pages total.

(Continued)

*Primary Examiner*—Sang Nguyen
(74) *Attorney, Agent, or Firm*—Harness, Dickey & Pierce, P.L.C.

(57) ABSTRACT

The invention relates to a test method for the testing of the functional capability of a monitoring sensor which scans a protective field to be monitored using a scanner. In accordance with the invention, at least one contour test object and one field test object are provided outside the protective field to be monitored. A field set is defined having at least two scan fields, with the first scan field of the first field set comprising the protective field to be monitored and at least one contour test object and the second scan field of the first field set comprising at least the region of the field test object. In a first test sequence, the protective field to be monitored is scanned with the first field set, with a positive first output signal only being generated when the contour test object is detected in the expected position in the first scan field and with a negative second output signal being generated when the field test object is detected in the second scan field of the first field set. A second field set having reversed parameters is defined and scanned in a second test sequence. The correct operability of the sensor is only assumed if, after a change to the first test sequence, a positive first output signal and a negative second output signal are found or, after a change to the second test sequence, a positive second output signal and a negative first output signal are found.

27 Claims, 4 Drawing Sheets

U.S. PATENT DOCUMENTS

| | | | | |
|---|---|---|---|---|
| 4,645,917 | A | * | 2/1987 | Penney et al. .......... 250/559.23 |
| 4,823,901 | A | | 4/1989 | Harding |
| 5,663,550 | A | * | 9/1997 | Peng ..................... 235/462.39 |
| 6,034,349 | A | * | 3/2000 | Ota ....................... 219/121.73 |
| 6,216,950 | B1 | * | 4/2001 | Ohkawa et al. .......... 235/462.4 |
| 6,521,866 | B1 | * | 2/2003 | Arai et al. .............. 219/121.73 |

FOREIGN PATENT DOCUMENTS

| | | |
|---|---|---|
| DE | 3908273 C1 | 3/1990 |
| DE | 4340756 A1 | 9/1994 |
| DE | 4341080 C1 | 9/1995 |
| DE | 19800968 C2 | 10/2002 |
| EP | 0573697 A2 | 6/1992 |

OTHER PUBLICATIONS

European Search Report relating to European Patent Application No. 08004202.1 dated Aug. 19, 2008.

Translation of European Search Report relating to European Patent Application No. 08004202.1 dated Aug. 19, 2008.

* cited by examiner

Fig. 1A outA = ON
outB = OFF

Fig. 1B

Fig. 3 outA = ON
outB = OFF

Fig. 4 outA = OFF
outB = ON

TEST METHOD FOR THE TESTING OF THE FUNCTIONAL CAPABILITY OF A MONITORING SENSOR, MONITORING METHOD AND MONITORING SENSOR

The invention relates to a test method for the testing of the functional capability of a monitoring sensor which is provided for the monitoring of a protective field and which scans an at least two dimensional protective field to be monitored using at least one scanner, with light of a light source being transmitted via a light deflection unit into a protective field to be monitored and light which is, where applicable, reflected or remitted by an object present in the protective field being detected by a receiver. The invention furthermore relates to a corresponding monitoring method and to a corresponding monitoring sensor.

Laser scanners are frequently used for the monitoring of protective fields. A light beam generated by a laser is deflected via a light deflection unit into a protected zone and is reflected or remitted there by an object which may be present. The reflected or remitted light moves back to the laser scanning unit again and is detected by a receiver there. The light deflection unit is designed to be pivotable or rotatable as a rule such that the light beam generated by the laser sweeps over a protective field generated by the pivot movement. If a reflected light signal received by the receiver is received from the protected zone, a conclusion can be made on the angular position of the object in the protected zone from the angular position of the deflection unit.

If, for example, the transit time from the—for example pulsed—laser light is additionally measured, a conclusion can also be drawn on the distance of the object from the laser scanner from the transit time using light speed. Two dimensional protective fields can be monitored completely, for example, in this manner.

If a non-permitted object is located in the protective field, a corresponding warning signal or control signal can be output by the receiver unit.

Such systems are used in driver-less transport systems, for example, to avoid collisions. Other applications relate to machines, for example, in which a danger zone has to be monitored which may not be infringed by an operator in the operation of the machine. It can be a robot working zone, for example. If a non-permitted object—that is, for example, a leg of an operator—is found in the danger zone with the help of the laser scanner, an emergency stop of the machine is effected.

Reference is made by way of example to the laying open specification DE 43 40 756 A1 in which a laser scanning device is described with a light deflection device with which a two dimensional protective field can be monitored. In this prior art, the spacing information is determined from the measurement of the pulse transit time of a light pulse transmitted into the protected zone.

If such scanning systems are used as safety systems, high safety demands have to be satisfied. DE 39 08 273 C1 describes a self-test device for a scanning light scanner in which a substantially semi-circular protected zone contains light sources, light absorbers and reflectors which are arranged in a known position. A check is made during the scanning process whether a light signal from the light sources is incident at the expected points on the receiver, whether a light beam transmitted by the laser system is reflected by the reflectors and whether no signal is received at the positions of the absorbers. Deviations from this expected procedure are indicative of an error of the system. If the system is used, for example, in the control of a vehicle, an emergency stop can be triggered in this case.

It is the object of the present invention to provide a test method for the testing of the functional capability of a monitoring sensor and a monitoring method for the monitoring of a protective field which are simple to carry out and which can be realized in a cost effective manner. This object is satisfied by a test method having the features of claim 1 or by a monitoring method having the features of claim 11. Claim 14 is directed to a monitoring sensor for the carrying out of the methods in accordance with the invention. Dependent claims are directed to advantageous embodiments.

In the test method in accordance with the invention, at least one contour test object is provided outside the protective field to be monitored which is, however, still in the detection region of the sensor. The position of the contour test object is known in at least one spatial dimension. For example, with a scanner in which the laser light beam is moved over the protective field with the help of a pivotable light deflection unit, at least the angular range of the at least one contour test object is therefore known, for example.

In addition, at least one field test object is provided outside the protective field to be monitored, but in the detection region of the sensor.

An embodiment is particularly reliable in which the position of the at least one contour test object is completely known, that is, for example, both the angle and the spacing relative to a pivotable laser scanning system.

In accordance with the invention, a first field set is defined with at least two scan fields. In this connection, the first scan field of this first field set comprises the complete protective field to be monitored and the region of at least one contour test object and the second scan field of the first field set comprises at least the region of a field test object.

On the carrying out of a first test sequence, the protective field to be monitored and the regions of the contour test object and of the field test object are scanned at least once using this first field set. A positive first output signal is only generated when the contour test object in the first scan field of this first field set which inter alia comprises the total protective field to be monitored is detected in the expected position (optionally while taking a tolerance range into account). A negative second output signal is generated when the field test object is detected in the second scan field of the first field set. With a proper function and a free protective field, the first test sequence therefore results in a positive first output signal and a negative second output signal.

In addition, a second field set having at least two scan fields is defined, with the first scan field of the second field set comprising at least the region of the field test object and with the second scan field of the second field set comprising the protective field to be monitored completely and the region of at least one contour test object. When precisely two field sets are used, the definition of the scan fields of the second field set is therefore reversed in comparison with the definition of the scan fields of the first field set.

In a second test sequence, the protective field to be monitored and the regions of the contour test object and of the field test object is scanned at least once using the second field set. If the contour test object is detected in the expected position (optionally while taking a tolerance range into account) in the second scan field of the second field set, which inter alia comprises the total protective field to be monitored, a positive second output signal is generated. If the field test object is detected in the first scan field of the second field set, a negative first output signal is generated.

It is mentioned by way of explanation that in the present text the respective output signal which belongs to the respective first scan field of a test sequence is called the first output signal and the respective output signal which belongs to the respective second scan field is called the second output signal.

The correct operability of the sensor is assumed if, after a change to the first test sequence, a positive first output signal and a negative second output signal are found or, after a change to the second test sequence, a positive second output signal and a negative first output signal are found. In this connection, method procedures are also included in which, after the change of the field set, a time period of, for example, some hundred milliseconds is first waited, which corresponds approximately to the switching cycle, before the new assignment of the output signals is checked or used.

The presence of a contour test object is therefore checked, on the one hand, in the expected position in each of the field sets, with the first output signal being relevant in a first test sequence and the second output signal being relevant in a second test sequence. The respective other output signal is in each case set to negative by the detection of a field test object.

The received signals of the receiver are therefore evaluated differently in the determination of the first and second output signals of the different field sets.

The reliability of the output signals of the scanner is also checked by the changing from one test sequence to another test sequence.

If a non-permitted object is already located in the protective field during a test sequence, that scan field is infringed which comprises the protective field. The corresponding output signal belonging to this scan field is not positive, as expected, but negative, so that an error is assumed in every case and a warning signal or stop signal is generated.

Generally, exact knowledge of the position of the field test object disposed outside the protective field is not absolutely necessary as long as it serves to se the corresponding output signal (the second output signal during a first test sequence or the first output signal during a second test sequence) to "negative" by its detection. It only has to be ensured that the corresponding scan field of the respective field set (the second scan field of the first field set or the first scan field of the second field set) comprises the field test object. The additional knowledge of the position of the field text object, on the other hand, increases the operating safety of the test method.

In a simple embodiment of the method, a positive output signal means that the corresponding output or output channel of the laser scan system is active, whereas a negative output signal is realized by a deactivated corresponding output or output channel of the laser scan system.

With such an embodiment, it can be realized in a simple manner that the output signal set to positive serves as the sensor signal.

A change is advantageously made several times between different field sets during a monitoring procedure for the continuous checking of the operability.

A change period of 1 to 10 seconds, preferably of 3 to 7 seconds, is particularly practical. A change is very particularly preferably made every 5 seconds. A corresponding selection of the period ensures a practical compromise between the safety demands, on the one hand, which require a switchover period which is as short as possible, and a simple evaluation which means switchover periods which are not too short.

If proper operation was found during a test sequence, the corresponding field set is maintained for a specific period of time, for example for some seconds (for example 5 seconds) before a switch to the other field set is made. The second test sequence is then carried out and, on a proper procedure, the second field set is maintained for some seconds, for example again 5 seconds.

It is particularly favorable when the change period is freely adjustable so that they can be adapted to the demands and relationships of the scenario to be monitored.

A simple embodiment makes provision that the output signal of a test sequence, that is the first and the second output signals, are each determined from the signals of the receiver during the same scan of the protective field to be monitored. For this purpose, which data belong to the respective first scan field and which data belong to the respective second scan field is extracted from the raw data of the received signal during the scan process.

Alternatively, the respective first output signal of a test sequence can be determined during a first scan of the protective field to be monitored and the respective second output signal of the test sequence can be determined in a second scan of the protective field to be monitored.

The contour test object located outside the protective field and the field test object located outside the protective field can be two different objects at different angular positions of the scanner, for example. A simple embodiment makes provision for one and the same test object to be used as the contour test object and as the field test object.

To reduce the influence of external short-term interference signals, a plurality of sequential scans is advantageously respectively carried out without changing the field set before a total signal is generated from the resulting output signals.

Provision is made in an embodiment for a correct operation only to be assumed when a change from a first field set to a second field set is reflected in the output signals within a period of time which is shorter than a predetermined threshold, for example some hundred milliseconds (for example 400 milliseconds). Such an embodiment enables a specific tolerance with respect to a possibly present switching cycle. The threshold value is determined, for example, with reference to the required safety demands. On the other hand, with a driver-less transport system, for example, a safety spacing to be observed can be fixed from the threshold value in conjunction with the maximum speed of the transport system.

The invention furthermore relates to a monitoring method for the monitoring of a protective field with a monitoring sensor in which, in accordance with the invention, the method in accordance with the invention is used for the testing of the functional capability of the sensor. During the first test sequence and during the following time period up to the change to another field set, the first output signal is used as the sensor output signal and during the second test sequence and during the following time period up to the change to another field set, the second output signal is used as the sensor output signal.

During the first test sequence, the first scan field comprises the protective field to be monitored and ensures its complete monitoring. During the second test sequence, on the other hand, the second scan field comprises the total protective field to be monitored so that the complete monitoring of the protective field is ensured via this scan field.

A complete monitoring of the protective field to be monitored is thus ensured at all times both during the first test sequence and during the second test sequence and the respective following time periods. The actual monitoring signal is present once as the first output signal and once as the second output signal due to the change of the field sets so that the outputs of the scanner can be changed and can thus be checked with respect to one another.

A change advantageously takes place several times between the field sets during one monitoring time period. Each change corresponds to a test sequence which delivers information on the correct operability of the monitoring sensor. Such a change can, for example, respectively take place after a period which amounts to between 1 to 10 seconds, advantageously 3 to 7 seconds, particularly advantageously approximately 5 seconds.

The respective positive output signal, that is in particular the respective active output signal, can be used as the sensor signal in the time periods between the test sequences.

In other embodiments, provision can be made for the total monitoring time period to be formed by a plurality of directly sequential different test sequences.

The methods in accordance with the invention use at least two field sets or at least two test sequences. Methods using a larger number of field sets and a correspondingly larger number of test sequences are likewise covered. The use of two field sets is, however, particularly simple in application.

In the methods in accordance with the invention, the individual field sets each use at least two scan fields and a corresponding number of output signals. Methods in which one or more field sets use a larger number of scan fields are likewise covered. The user of two respective scan fields is, however, particularly simple in evaluation.

The methods in accordance with the invention are not restricted to the use of only one contour test object and only one field test object.

The invention furthermore relates to a monitoring sensor for the carrying out of a test method in accordance with the invention and/or of a monitoring method in accordance with the invention. The monitoring sensor has at least one sensor with a light source, preferably a laser, a light deflection unit for the deflection of the light of the light source into a protective field to be monitored and a receiver for the detection of light which is, where applicable, reflected or remitted by an object present in the protective field. A memory unit is furthermore provided in which scan fields of at least two different field sets are stored. The monitoring sensor in accordance with the invention has at least one test object outside the protective field to be monitored, with the position of the at least one test object being known and optionally also being stored in the memory unit. An evaluation and control unit is configured so as to control the scanner such that it scans the protective field to be monitored and the region of the at least one test object during a first test sequence in accordance with a first field set and during a second test sequence in accordance with a second field set.

The monitoring sensor in accordance with the invention allows the carrying out of a test method in accordance with the invention or of a monitoring method in accordance with the invention. For this purpose, field sets are stored in the memory unit which have the properties described above.

The advantages of the monitoring sensor in accordance with the invention, particular embodiments and their advantages result in an analogous manner from the embodiments and advantages of the methods in accordance with the invention described above.

The methods in accordance with the invention and the sensor in accordance with the invention can be used advantageously and while satisfying high safety demands, for example, for the securing of machines, for the control of vehicles, in particular driver-less vehicles, for the control of doors or gates, etc.

The methods in accordance with the invention and the sensor in accordance with the invention are in particular suitable for application in systems which are used in the outdoor area. Malfunctions or incorrect detections can, for example, occur more frequently here due to weather influences which require a secure check of the operability of the sensor.

The invention will be explained in detail with reference to the enclosed schematic Figures. There are shown FIGS. 1A-1B a first embodiment with two test objects during a first operating state.

The monitoring sensor described in the following can serve, for example, for the monitoring of the protective field of a robot or of a machine. For example, the danger zone of a crane, into whose danger zone no operator may intrude during operation, can be monitored as the protective field. If a non-permitted object, for example the leg of an operator, is located in the danger zone, this is detected by the described sensor and a warning signal is output and/or the movement effecting the danger is stopped.

Other applications of the sensor described in the following relate, for example, to transport systems, in particular driver-less transport systems, with the region before the transport system being monitored here to avoid collisions. If an object is detected in the protective field in front of the transport system, a stop signal is triggered to stop the transport system.

The term "non-permitted object" is used in the present text for non-permitted or interfering objects in the protective field. Endangered body parts of operators can in particular also be meant by it, for example.

Figure 1A:
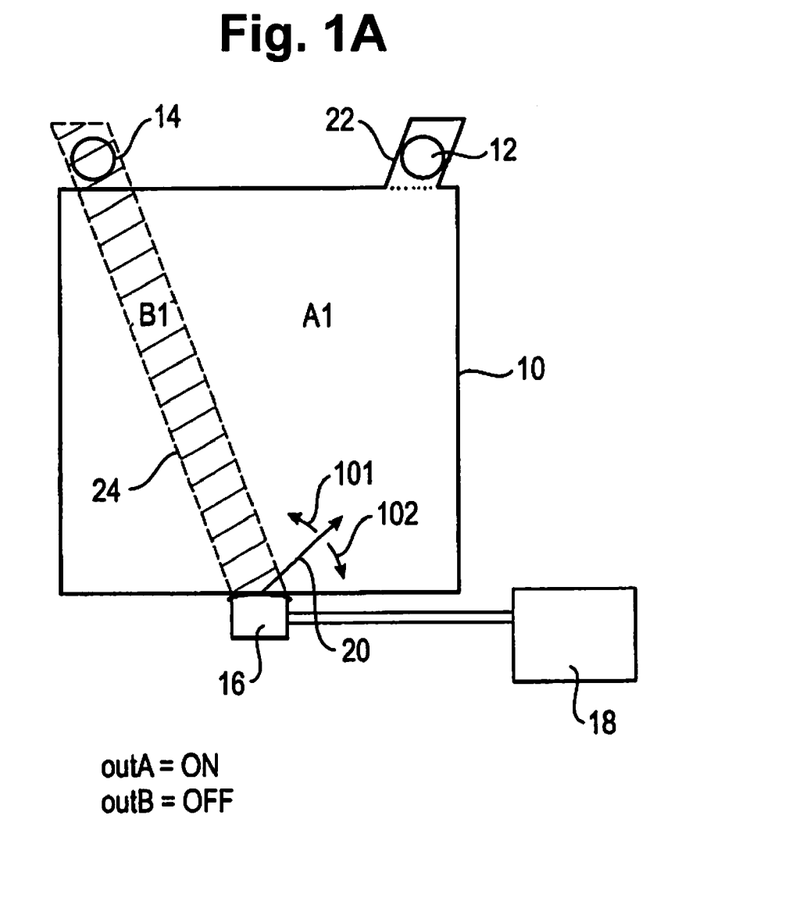
Figure 1B:
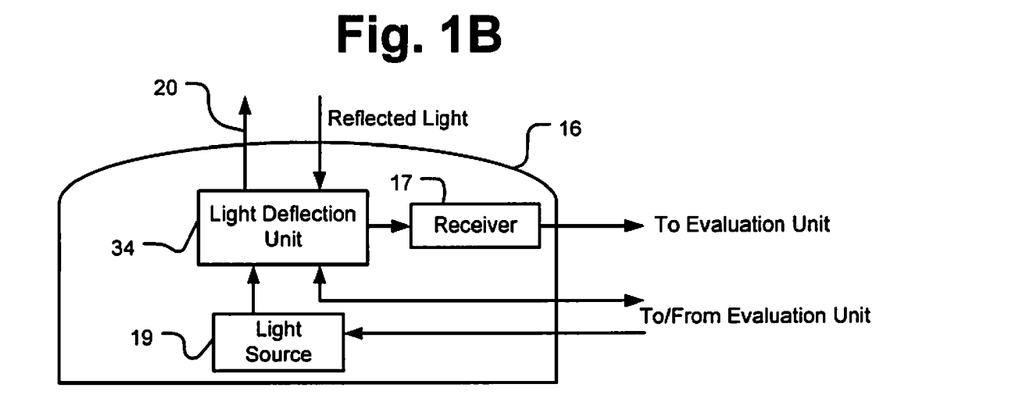

FIGS. 1A-1B schematically shows the arrangement of a scan system for the carrying out of a method in accordance with the invention. Reference numeral 16 designates a laser scan system which is connected to an evaluation and control unit 18 which, for example, includes a microprocessor and a memory unit. The laser scan system 16 can transmit first and second output signals outA and outB via a light source 19, such as a laser, to the evaluation and control unit. The geometry of scan fields A1, B1, A2, B2, which will be described in more detail further below, is stored in a memory unit which can, for example, be provided in the evaluation and control unit 18.

Reference numeral 10 designates a protective field which is rectangular in the present example and which should be monitored for the presence of non-permitted or interfering objects using the laser scan system in accordance with the invention.

For this purpose, in a manner known per se, a laser beam is transmitted from the laser scan system 16 into the protective field as a scan light beam 20 which is pivoted in the pivot directions 101 and 102 with the help of a pivotable, i.e. moveable light deflection unit 34 provided in the laser scan systems 16 to sweep over the protective field 10. Light reflected by an object is reflected back to the laser scan system 16 and is detected there. A conclusion can be drawn from the position of the light deflection unit on the angle at which the reflecting object is located relative to the laser scan system 16. A conclusion can be drawn on the distance of the object from the laser scan system 16 from the transit time of a light pulse from the laser scan system 16 up to the reflecting object and back.

The light used can be selected to be in the visible spectral range, but also in other spectral ranges, for example in the infrared or ultraviolet spectral ranges. Laser light is advantageously used.

A contour test object 12 is located outside the protective field to be monitored. It is nevertheless located in the detection zone of the laser scan system 16 and defines an angular range in which a signal is expected. If operability of the system is present, the contour test object 12 reflects light, which is transmitted by the laser scan system 16, back to the laser scan system 16 and generates a corresponding received signal there.

A further test object is provided which is called a field test object 14 in the following and which is not identical with the contour test object 12 in the embodiment shown.

The test objects 12, 14 located outside the protective field 10 are selected with a reflectivity which approximately corresponds to a natural object. The shape of the test objects is not fixed and can also be formed by contours or similar.

FIG. 1 shows a first test sequence. A first field set comprises scan fields A1 and B1. The first scan field A1 comprises the total protective field 10 and at least one scan field continuation 22 in which the contour test object 12 disposed outside the protective field 10 is located.

The second scan field B1 of the first field set comprises at least the region 24 which is shown hatched in FIG. 1A, which quasi defines a corridor starting from the laser scan device 16 and which includes the field test object 14.

The first field set is defined such that a positive first output signal (outA=ON) is generated when the contour test object 12 is detected at the expected position and if otherwise no object is present in the scan field A1. The detection of the contour test object 12 is a necessary requirement for a positive first output signal outA.

The second output signal is set to negative (outB=OFF) when the field test object 14 is detected.

In this state set forth beneath the Figure, the signal of the first output signal is therefore relevant for the monitoring of the protective field 10.

Generally, an output signal "ON" can be realized, for example, in that the associated output or output channel of the laser scan system is active, whereas an output signal "OFF" is realized in that the associated output or output channel of the laser scan system is deactivated. It is thus possible in a simple manner, for example, to use the signal respectively applied to the active output as the sensor signal.

Figure 2:
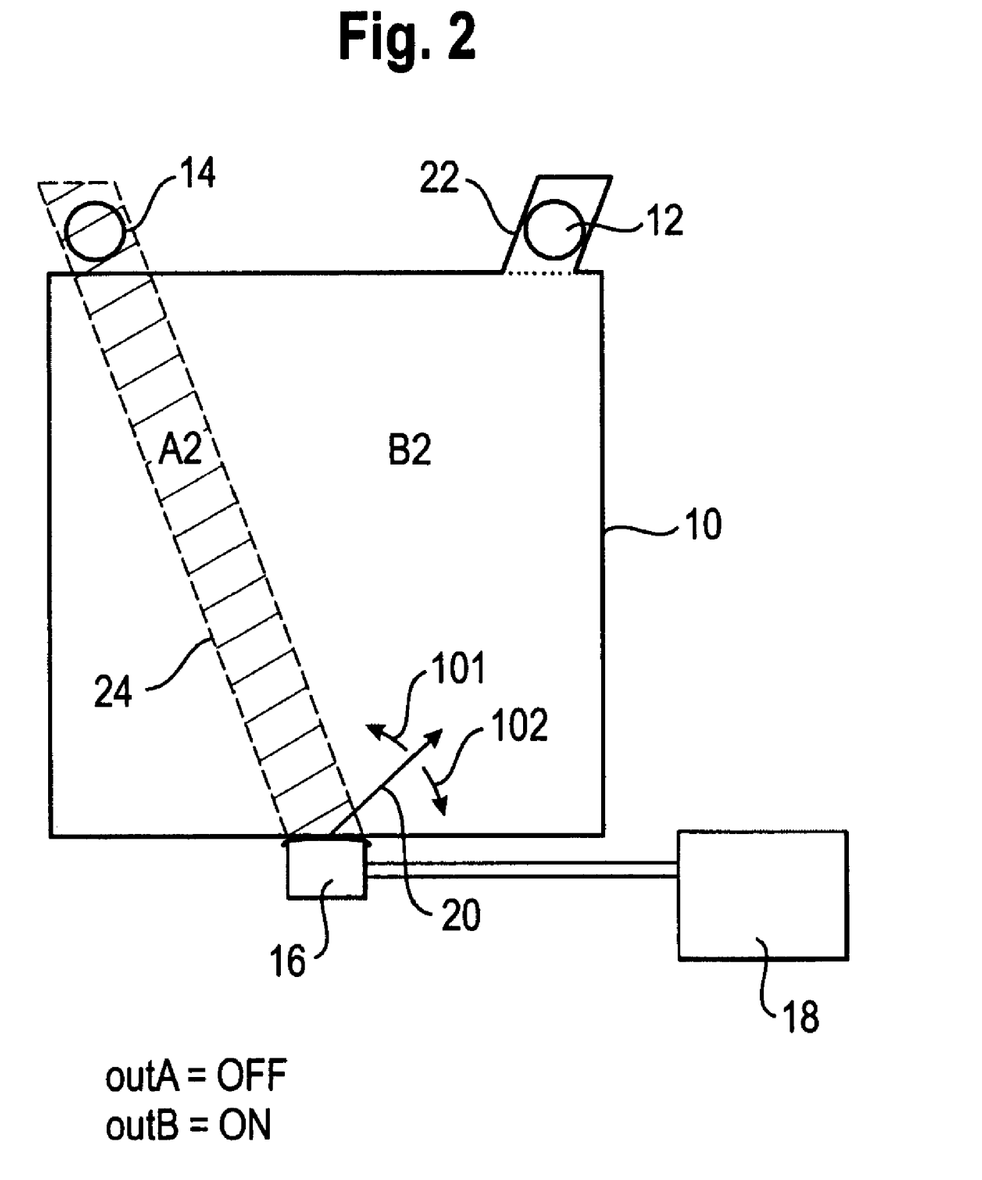
FIG. 2 a first embodiment with two test objects during a second operating state.

FIG. 2 shows the same embodiment on the carrying out of a second test sequence. A switchover has now been made from the control and evaluation unit 18 to the second field set. In the second field set, the first scan field A2 is selected such that it at least comprises the angular range 24 which covers the field test object 14. The second scan region B2 of the second field set comprises the total protective field 10 and at least that scan field continuation 22 outside the protective field 10 which includes the contour test object 12.

During the second test sequence, a positive second output signal (outB=ON) is generated when the contour test object 12 is detected at the expected position in the second scan field B2. This is the required condition for a positive output signal outB.

At the same time, a negative first output signal (outA=OFF) is generated when the field test object 14 is located in the first scan region A2 of the second field set. In this state set forth beneath the Figure, the signal of the second output signal is therefore relevant for the monitoring of the protective field 10.

The described operating states are adopted as follows during the operation of the monitoring sensor:

First, the first test sequence is carried out in accordance with the setting of FIGS. 1A-1B with the first field set shown there. The protective field 10 is scanned by the laser scan device 16 and a first output signal outA is generated. A receiver 17 in the laser scan device 16 detects object present in the protective field. If no non-permitted object is located in the protective field 10 and if the contour test object 12 is detected at the expected point, the first output signal outA is set to ON. During the scan procedure, the field test object 14 is detected in the second scan region B1 of the first field set and the second output signal outB is thus set to OFF.

A corresponding output of the laser scan system 16 is generated, for example, after ten such scans to enable an averaging for the compensation of short-term interfering influences.

If the contour test object 12 is not detected at the expected point of the scan region A1 during this scan, the first output signal outA is set to OFF. If, on the other hand, no object is detected during this operating state in the second scan region B1 of the first field set, then outB is set to ON.

With a correct operability, outA is therefore set to ON and outB to OFF. This state is initially maintained for the monitoring operation. The output of the first output signal is active and is used as the sensor signal output up to the next switchover of the field set.

After 5 seconds, for example, a switch is made by the evaluation and control unit 18 to a second field set, with this configuration being shown in FIG. 2. The function of the first and second output signals is swapped over in this process. The first scan region A2 of the second field set is in particular defined here such that it includes the corridor 24 between the laser scan device 16 and the field test object 14. The second scan region B2 of the second field set is defined such that it comprises the total protective field 10 together with the scan field continuation 22 which includes the contour test object 12.

In this operating state, the first output signal outA is set to OFF when the field test object 14 is located in the first scan region A2 of the second field set. The second output signal outB is only set to ON when the contour test object 12 is located in the second scan region B2. The second test sequence is thus carried out with roles of the output signals outA and outB swapped over with respect to the first test sequence. With a free protective field 10, a positive second output signal outB is generated in this process when the contour test object 12 is detected, on the one hand, and the protective field 12 is free, on the other hand. The output of the second output signal is active and it serves as the sensor signal output up to the next switchover of the field set.

After a further 5 seconds, for example, a switch back to the first field set can again be made.

The correct operability is only assumed when, after the change to the first test sequence (at least after waiting a tolerable switching cycle time of, for example, some hundred milliseconds, for example 400 milliseconds), the first output signal outA is at ON and the second output signal outB is at OFF or if, after the change to the second test sequence (after waiting a tolerable switching cycle time), the first output signal outA is at OFF and the second output signal outB is at ON. Otherwise, a warning signal or a stop signal is generated for the device whose protective field is being monitored with the monitoring system.

If it is initially monitored by the evaluation and control unit 18 how long it takes until the switchover from one field set to the other is reflected in the output signals, the response time for the switching cycle of the outputs can be determined. For this purpose, for example, the response time for the switching cycle of the outputs after a field set switchover is monitored over a safe time gate, 400 milliseconds for example. If the response time exceeds this threshold value, for example, an error is assumed and the warning signal and/or stop signal is generated.

In the manner of operation described in accordance with the operating states of FIGS. 1A and 2, the output signals outA and outB are determined from the raw data of at least one scan. Alternatively, the first output signal outA can be determined in a first scan and the second output signal outB can be determined in a second scan as directly sequential thereto as possible.

It is generally also possible that a test object serves as a contour test object during a first operating state and as a field test object during another operating state. The test objects 12, 14 can thus, for example, swap over their roles on the change of the operating state of FIG. 1A to the operating state of FIG. 2.

Other embodiments do not only use two test objects, but rather a plurality of test objects whose reflections are evaluated in the manner described.

Figure 3:
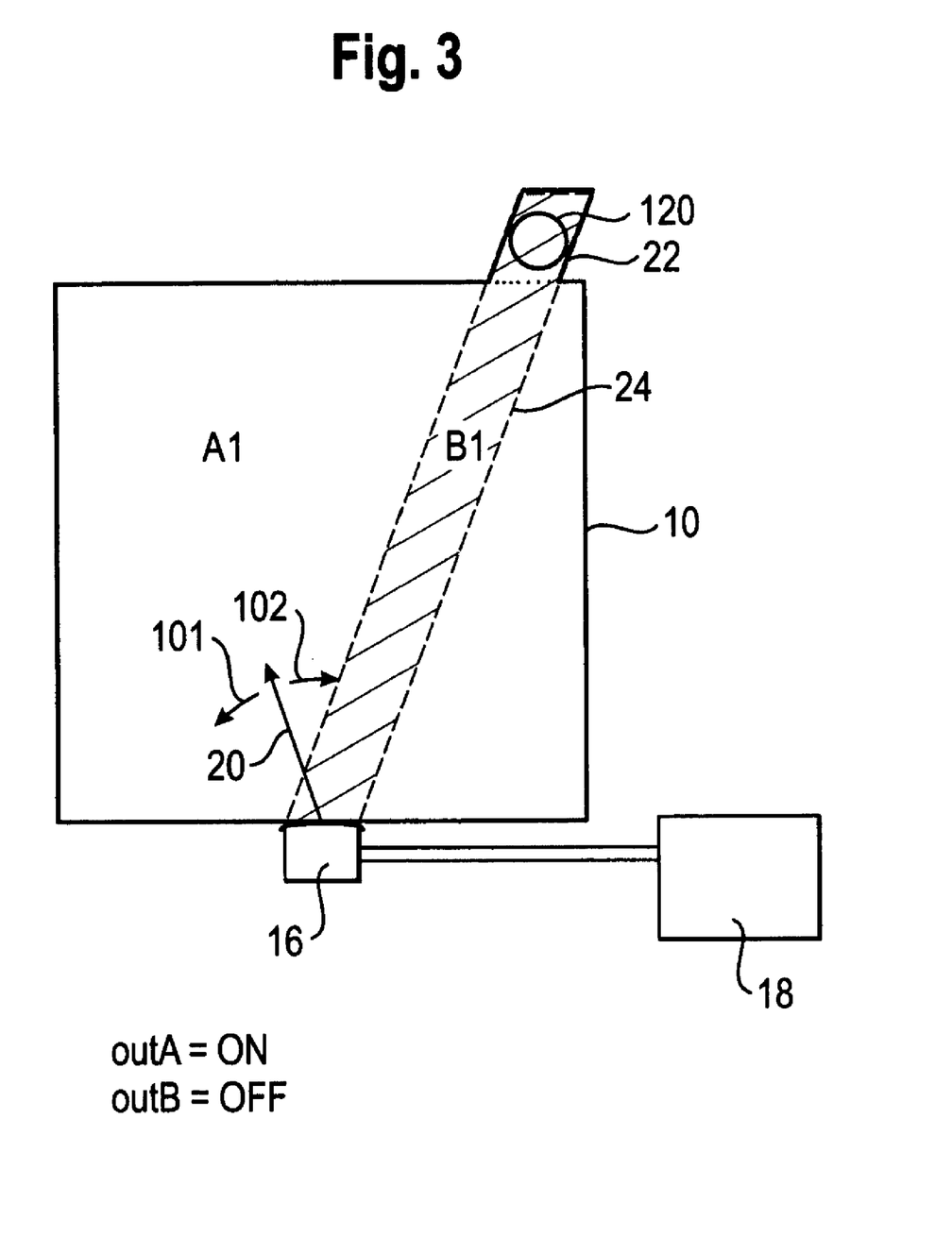
FIG. 3 a second embodiment with one test object during a first operating state.
Figure 4:
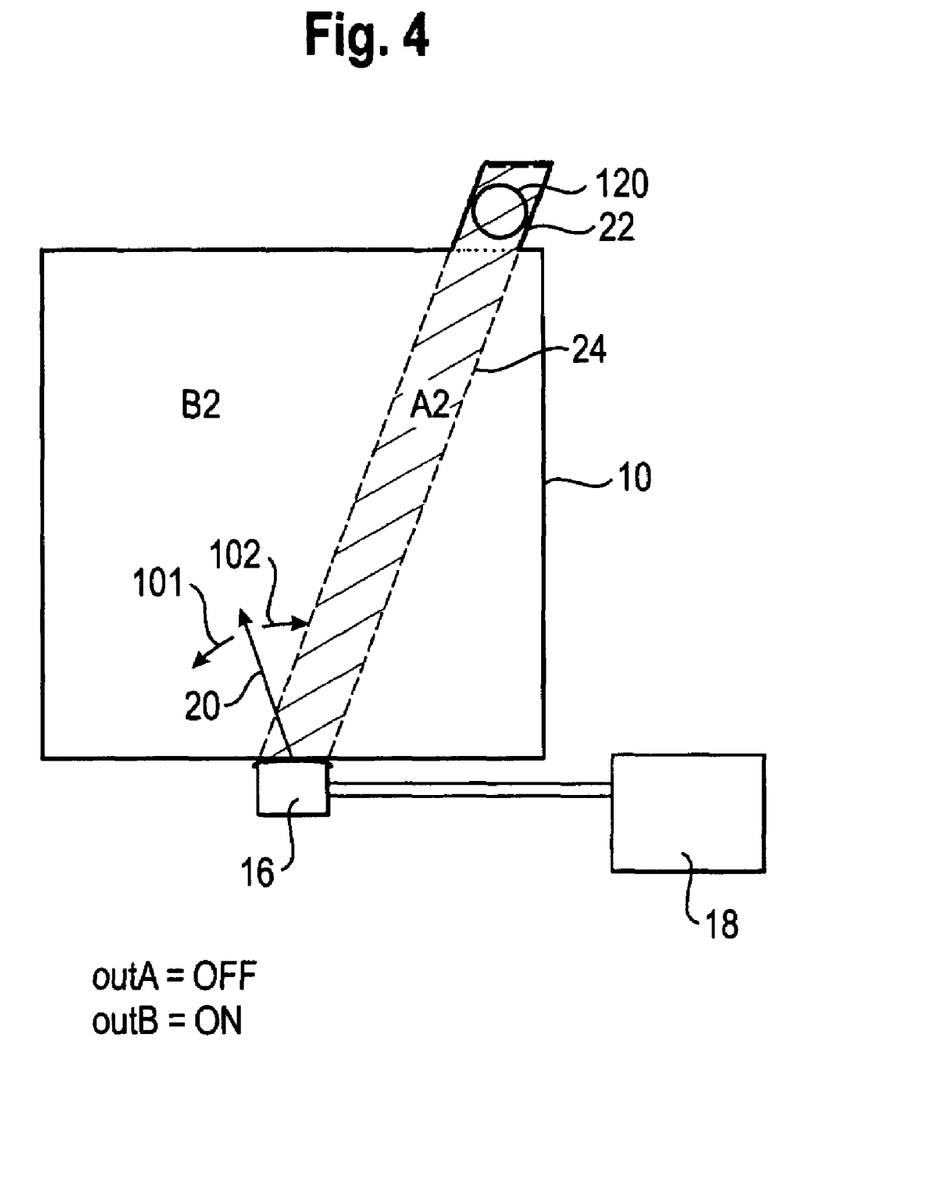
FIG. 4 a second embodiment with one test object during a second operating state.

FIGS. 3 and 4 show another embodiment in which only one test object 120 serves both as a contour test object and as a field test object. The functional principle corresponds to the embodiment of FIGS. 1A and 2.

During a first test sequence, a first field set is used in which the first scan field A1 comprises the protective field 10 and the continuation 22 in which the test object 120 is located. The scan field B1 comprises the corridor 24 which is shown hatched and which includes the test object 120. If the protective field 10 is free and if the test object 120 is detected in the scan region A1, the first output signal outA=ON. The test object 120 is also detected in the second scan region B1 of the first field set, whereby the second output signal outB is set to OFF.

As also described for the embodiment of FIGS. 1A and 2, a switch is made, for example after 5 seconds, to a second field set which is shown in FIG. 4. Here, the first scan region A2 comprises the corridor 24 which includes the test object 120 as the field test object. If an object is detected here, the first output signal outA is set to OFF.

The second scan region B2 of the second field set comprises the total protective field 10 and the continuation 22 which includes the test object 120. If the test object 120 is detected at the expected position, the second output signal outB is set to ON.

The evaluation and further processing of the signals takes place as described for the embodiment of FIGS. 1A and 2.

The described embodiments are based on the use of two field sets, with the output signals outA, outB being evaluated differently in the individual field sets. A plurality of field sets can also be provided depending on the demands. More than two scan fields per field set can equally also be provided.

The test objects 12, 14, 120 were only shown by way of example at the positions shown. They can naturally also be located at different points outside the protective field 10, for example to the side thereof. The rectangular representation of the protective field 10 per se is also only of a schematic nature and can also include other shapes, in particular irregular shapes. If objects are located in the protective field whose presence is permitted during operation (for example, holding devices for workpieces, etc.), they can be taught to the system in the same way as the protective field shape, for example, in a teach-in process.

The switchover between the field sets, the evaluation and generation of corresponding warning signals and/or control signals can be carried out automatically by the evaluation and control unit.

Possible error scenarios are recognized as follows in the embodiments described:

If, for example, the front plate of the laser scan system is dirty or if its detection capability is reduced in another manner, this is recognized in that the evaluation and control unit 18 does not receive any signal which corresponds to the contour test object 12 or neither of the output signals is set to ON.

With a defective laser scan system 16, the system does not react to the switchover from one field set to another field set. An error is recognized since the signal does not change.

The signal equally does not change when a wire break or a short circuit occurs at another point of the system.

A short circuit between the outputs of the laser scan system 16 is expressed, for example, in identical output signals outA, outB of which one should be at OFF and one at ON on correct operability.

If the control input of the laser scan system 16 does not react, no field set switchover at all is triggered and the system recognizes an error of the system by the lack of the signal change.

If, for example, the contour test object 12 is missing, in a deviation from the normal state during the first test sequence the first output signal outA will not be at ON and the second output signal outB will not be at ON during the second test sequence. The system recognizes an error and can generate the corresponding warning signal or stop signal.

If, for example, the field test object 14 is missing, the second output signal outB is not at OFF during the first test sequence and the first output signal outA is not at OFF during the second test signal. The system also recognizes a deviation from the norm here and can generate a corresponding warning signal or stop signal.

If the system, in particular the laser scan system 16, is misadjusted, for example, by a pivoting, the test responses will in particular be displaced in time or will not be present at all on the determination of the position of the contour test object 12 so that a malfunction can be detected in this manner.

Reference Numeral List 10 protective field to be monitored
12 contour test object
14 field test object
16 laser scanner
18 evaluation and control unit
20 scan light beam
22 scan field continuation
24 scan field corridor
101, 102 pivot direction
120 test object
A1 first scan field of the first field set
B1 second scan field of the first field set
A2 first scan field of the second field set
B2 second scan field of the second field set
outA first output signal
outB second output signal

The invention claimed is:

1. A test method for testing of a functional capability of a monitoring sensor for monitoring of a protective field comprising:

scanning an at least two dimensional protective field to be monitored using at least one scanner, with light of a light source being transmitted via a movable light deflection unit into a protective field to be monitored and with light which is one of reflected and remitted by an object present in the protective field being detected by a receiver;

providing at least one contour test object outside the protective field to be monitored, but in a detection region of the sensor, with a position of the contour test object relative to the scanner being known in at least one spatial dimension;

providing at least one field test object outside the protective field to be monitored, but in the detection region of the sensor;

defining a first field set having at least two scan fields, with a first scan field of the first field set comprising the protective field to be monitored and a region of at least one contour test object and with a second scan field of the first field set comprising at least a region of the at least one field test object;

scanning the protective field to be monitored and regions of the at least one contour test object and of the at least one field test object at least once while using the first field set in a first test sequence;

generating a positive first output signal only when a contour test object is detected in an expected position in the first scan field of the first field set;

generating a negative second output signal when a field test object is detected in the second scan field of the first field set;

defining a second field set having at least two scan fields with a first scan field of the second field set comprising at least a region of a field test object and a second scan field of the second field set comprising a protective field to be monitored and a region of the at least one contour test object;

scanning the protective field to be monitored and the regions of the at least one contour test objects and of the at least one field test object at least once while using the second field set in a second test sequence;

generating a positive second output signal only when a contour test object is detected in the expected position in the second scan field of the second field set;

generating a negative first output signal when a field test object is detected in the first scan field of the second field set; and determining a correct operability of the sensor only if, after a change to the first test sequence, a positive first output signal and a negative second output signal are found or, after a change to the second test sequence, a positive second output signal and a negative first output signal are found.

2. The test method in accordance with claim 1, wherein a positive output signal is realized in that a corresponding signal output or signal output channel is active; and in that a negative output signal is realized in that a corresponding signal output or signal output channel is deactivated.

3. The test method in accordance with claim 1, further comprising switching over between the first and second field sets several times.

4. The test method in accordance with claim 1, wherein a time period between changes from one field set to another field set amounts to 1 to 10 seconds.

5. The test method in accordance with claim 4, wherein the time period between changes from one field set to another field set amounts to 3 to 7 seconds.

6. The test method in accordance with claim 4, wherein the time period between changes from one field set to another field set amounts to approximately 5 seconds.

7. The test method in accordance with claim 1, further comprising setting a time period between changes from one field set to another field set.

8. The test method in accordance with claim 1, further comprising determining the first and second output signals of the first and second test sequences from the scanner signals of one scan of the protective field to be monitored.

9. The test method in accordance with claim 1, further comprising determining the first output signal of a test sequence in a first scan of the protective field to be monitored; and determining the second output signal of the test sequence in a second scan of the protective field to be monitored.

10. The test method in accordance with claim 1, further comprising using one test object as the contour test object and as the field test object.

11. The test method in accordance with claim 1, further comprising implementing a plurality of sequential scans without changing the field set before a total signal is generated from the output signals.

12. The test method in accordance with claim 1, further comprising monitoring a time period until a change from one field set to another field set is reflected in the first and second output signals; and determining a correct operability of the monitoring sensor only when the time period is less than a predetermined threshold value.

13. The test method in accordance with claim 1, wherein the light source includes a laser.

14. The test method in accordance with claim 1, wherein the movable light deflection unit is pivotable.

15. The test method in accordance with claim 1, wherein the position of the contour test object relative to the scanner is known completely.

16. A monitoring method for monitoring of a protective field using a monitoring sensor comprising;

scanning an at least two dimensional protective field using at least one scanner, with light of a light source being transmitted via a movable light deflection unit into a protective field to be monitored and with light which is, where applicable, reflected or remitted by an object present in the protective field being detected by a receiver, wherein a test method is used for testing of functional capability of the monitoring sensor;

providing at least one contour test object outside the protective field to be monitored, but in a detection region of the sensor, with a position of the contour test object relative to the scanner being known in at least one spatial dimension;

providing at least one field test object outside the protective field to be monitored, but in the detection region of the sensor;

defining a first field set having at least two scan fields, with the first scan field of the first field set comprising the protective field to be monitored and a region of at least one contour test object and with the second scan field of the first field set comprising at least a region of the at least one field test object;

scanning the protective field to be monitored and the regions of the at least one contour test object and of the at least one field test object at least once while using the first field set in a first test sequence;

generating a positive first output signal only when a contour test object is detected in an expected position in the first scan field of the first field set;

generating a negative second output signal when a field test object is detected in the second scan field of the first field set;

defining a second field set having at least two scan fields, with the first scan field of the second field set comprising at least the region of the field test object and the second scan field of the second field set comprising the protective field to be monitored and the region of the at least one contour test object;

scanning the protective field to be monitored and the regions of the at least one contour test objects and of the at least one field test object at least once while using the second field set in a second test sequence;

generating a positive second output signal only when a contour test object is detected in the expected position in the second scan field of the second field set;

generating a negative first output signal when a field test object is detected in the first scan field of the second field set;

determining the correct operability of the sensor only if, after a change to the first test sequence, a positive first output signal and a negative second output signal are found or, after a change to the second test sequence, a positive second output signal and a negative first output signal are found;

using the first output signal as the sensor output signal during a first test sequence and a following time period up to a change to another field set; and using the second output signal as the sensor output signal during a second test sequence and the following time period up to the change to another field set.

17. The monitoring method in accordance claim 16, wherein a time period between changes from one field set to another field set amounts to 1 to 10 seconds.

18. The test method in accordance with claim 17, wherein the time period between changes from one field set to another field set amounts to 3 to 7 seconds.

19. The test method in accordance with claim 17, wherein the time period between changes from one field set to another field set amounts to approximately 5 seconds.

20. The monitoring method in accordance with claim 16, further comprising implementing a plurality of directly sequential different test sequences to form a monitoring time period.

21. The test method in accordance with claim 16, wherein the light source includes a laser.

22. The test method in accordance with claim 16, wherein the movable light deflection unit is pivotable.

23. The test method in accordance with claim 16, wherein the position of the contour test object relative to the scanner is known completely.

24. A monitoring sensor for the monitoring of an at least two dimensional protective field, the monitoring sensor comprising the following:

at least one scanner with a light source a movable light deflection unit for deflection of light of the light source into a protective field to be monitored, and a receiver for detection of light which is, where applicable, reflected or remitted by an object present in the protective field;

a memory unit in which scan fields of at least two field sets are stored;

at least one test object outside the protective field to be monitored;

an evaluation and control unit configured so as to control the scanner such that it scans the protective field to be monitored and a region of the at least one test object during a first test sequence in accordance with a first field set and during a second test sequence in accordance with a second field set; and at least two test objects, with a position of at least one test object, which serves as a contour test object, being known and with another test object serving as a field test object, wherein the at least one test object is a contour test object provided outside the protective field to be monitored, but in a detection region of the sensor, with a position of the contour test object relative to the scanner being known in at least one spatial dimension, wherein the field test object is provided outside the protective field to be monitored, but in the detection region of the sensor, wherein the monitoring sensor is adapted to generate a first field set having at least two scan fields, with a first scan field of the first field set comprising the protective field and a region of the at least one contour test object and with a second scan field of the first field set comprising at least a region of one field test object, wherein the protective field and the regions of the at least one contour test object and of the at least one field test object are scanned at least once while using the first field set in a first test sequence, with a positive first output signal only being generated when a contour test object is detected in an expected position in the first scan field of the first field set and with a negative second output signal being generated when a field test object is detected in the second scan field of the first field set, wherein the monitoring sensor is further adapted to generate a second field set having at least two scan fields is defined, with the first scan field of the second field set comprising at least the region of the field test object and the second scan field of the second field set comprising the protective field and the region of the at least one contour test object, and wherein the protective field to be monitored and the regions of the at least one contour test objects and of the at least one field test object are scanned at least once while using the second field set in a second test sequence and a positive second output signal is only generated when a contour test object is detected in the expected position in the second scan field of the second field set and a negative first output signal is generated when a field test object is detected in the first scan field of the second field set; and correct operability of the sensor is only assumed if, after a change to the first test sequence, a positive first output signal and a negative second output signal are found or, after a change to the second test sequence, a positive second output signal and a negative first output signal are found.

25. A monitoring sensor in accordance with claim 24, wherein the first output signal is used as the sensor output signal during a first test sequence and a following time period up to a change to another field set; and the second output signal is used as the sensor output signal during a second test sequence and a following time period up to the change to another field set.

26. The test method in accordance with claim 24, wherein the light source includes a laser.

27. The test method in accordance with claim 24, wherein the movable light deflection unit is pivotable.

* * * * *

UNITED STATES PATENT AND TRADEMARK OFFICE
CERTIFICATE OF CORRECTION

PATENT NO. : 7,570,361 B2
APPLICATION NO. : 12/099328
DATED : August 4, 2009
INVENTOR(S) : Schneider et al.

It is certified that error appears in the above-identified patent and that said Letters Patent is hereby corrected as shown below:

Column 3, Line 36, delete "se" and insert --set--.

Column 3, Line 43, delete "text" and insert --test--.

Column 13, Line 32, after "in accordance", insert --with--.

Signed and Sealed this

Nineteenth Day of January, 2010

David J. Kappos
*Director of the United States Patent and Trademark Office*